March 5, 1929. E. L. BUXTON 1,704,551
DEVICE FOR REPRESENTING TIME AND RHYTHM
Filed Dec. 20, 1926
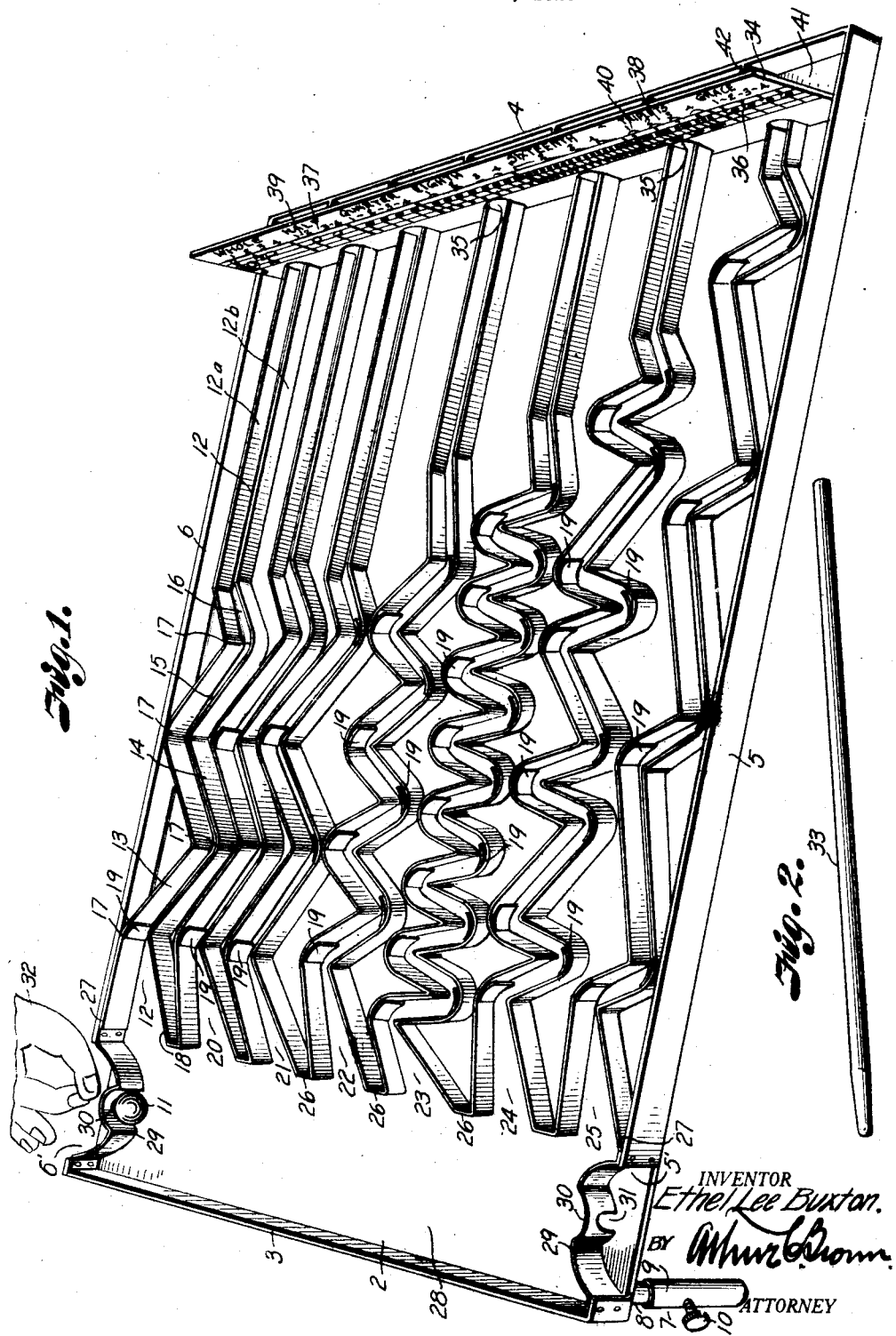

Patented Mar. 5, 1929.

1,704,551

UNITED STATES PATENT OFFICE.

ETHEL LEE BUXTON, OF KANSAS CITY, MISSOURI.

DEVICE FOR REPRESENTING TIME AND RHYTHM.

Application filed December 20, 1926. Serial No. 155,812.

My invention relates to means for representing music measure. My object is to provide a device whereby both time and rhythm may be represented coincidentally to several faculties and so promote, especially for children, apprehension of rhythm and ability to perceive, analyze, identify, reproduce and produce rhythmic groups.

In accomplishing my object I have produced elements and structure that may represent and use both time intervals and vibratory intervals of a music measure for group or individual instruction, for self-instruction and guidance, for entertainment and for play. I therefore offer my invention as an educational device, as an entertainment device and as a game; and for representation of temporal, spatial, tonal and other intervals to be perceived by one or another of the senses singly or co-ordinately.

While the fields of use for my invention are numerous and diverse, I particularly design it for the cultivation of rhythm consciousness, and I shall describe its structure and function in terms of that use. I direct attention therefore to conditions which invite provision of a device such as I offer.

The term "measure" indicates a quantity determined by a fixed standard, a measure in musical notation being that portion of the music lying between two bar lines and constituting the division of time containing a specified number of beats by which the air and motion of music are regulated. The measure sign of musical notation consists of a fraction, the denominator of which declares the value of accented or beat notes, and the numerator the number of such beat notes in a measure. The measure sign is usually read in terms of time, as two-four time, six-eight time, and is supposed to lead to observance of indicated duration of notes and rests, and of intervals between initiations of accents or beats. The accurate production of provided notes at prescribed intervals and having indicated duration does not alone result in veritable music. A factor to be added with which we are at present concerned is rhythm, a quality that includes not only the regular occurence of measured periods, but harmonious recurrence of stress; and, more important still, harmonious alternations of unaccented with accented periods.

Many mechancal devices provide signals sounding at regular time intervals whereby the duration of notes as prescribed by the denominator of the measure sign may be observed and the number of basic notations in a measure as so valued may be counted.

I offer a device that will represent and enable a user to apprehend the rhythm latent in the notations, and so bring forth more of the values of the unaccented notes, of the unstressed periods, of the portions of accented notes comprised in their duration, and of rests. My device also shows the relations between the opposing conditions that alternate to constitute rhythm, and makes those relations plain for guidance and apprehension. The benefits accrue both to performers or readers and to listeners.

I have aimed, further, to bring a plurality of faculties to the perception of rhythm. Devices signaling divisions of time convey their guidance to the ear and may convey their instruction to the eye also; but such instruction pertains only to regular recurrence of time intervals and comprising a continuous series of exactly duplicated signals. My device distinguishes the various elements of rhythm in a manner perceptible to the sight, hearing and touch. I provide other features designed to assist the user in identifying the elements of rhythm so perceived.

The chief element of present difficulty in teaching music and inculcating music appreciation resides in the lack of an efficient means of cultivating, awakening and establishing a sense of rhythm. My device constitutes such means, and comprises a structure that will now be particularly described with reference to the drawings in which:

Fig. 1 is a perspective view of my device, and

Fig. 2 is a perspective view of a baton or cue element that may be used with the device.

Referring more in detail to the drawings:

1 designates a shallow box constituting a field and consisting of a plane base 2, front rail 3, rear rail 4, and similar side rails 5 and 6 having apertures 5' and 6' adjacent the front rail. Attached to the under side of the base and adjacent the front rail is a pedestal 7, of which there may be two, comprising a post 8 and a sleeve 9 thereon projectible beyond the post for variably tilting the field, the sleeve to be fixed by the set screw 10. A ball 11 is provided, designed to roll in one or another of a plurality of guideways; for example, the whole note guideway 12 which is produced by edgedly erecting on the base two strips 12ª and 12ᵇ parallel with the sides of the field, the strips being spaced predeterminedly from each other and from the ends of the field and constituting the sides or side walls of the guideways.

A part of the guideway 12 is constituted a devious course having entrance adjacent the front rail of the field by bending the side walls laterally back and forth across the longitudinal extension of the guideway forming in the case of whole note guideway 12 four diversions, 13, 14, 15 and 16 readable from the said entrance of the guideway. The diversions produce a significant interior enclosed angle 17 of a sidewall that occurs alternately in one side wall 12ª and the other side wall 12ᵇ. There are four such enclosed angles, one to correspond with each of the four diversions of the guideway 12.

I am illustrating my structure as adapted to use in demonstrating rythm in four-four or common time. Each of the diversions represents the duration of a unit in a four-four time measure and each of the four angles represents a beat or accent in the marking of such a measure; except that the diversion representing duration of the concluding count of a measure may be eliminated; and that a diversion is provided indicated as 18 for directing the ball 11 into the guideway which may, however, be given function of duration. The structure is designed so that the ball 11 introduced into the guideway and traversing the same will impact the angles of alternate sides at regular intervals and so produce an accurately measured count of four. The guideway 12 designed as a whole note guideway is provided with a note-emitting plate 19 so shaped and so positioned that it receives the impact of a ball that may be introduced to the guideway, the plate in this instance being attached within an angle 17 adjacent the front rail of the field and so being the first angle of the series within the guideway 12 that the ball will encounter. The ball impacting the plate causes a note to be emitted therefrom which is the signal of beginning of the counts of the measure. This guideway 12 is a whole note measure reflector, so the arrangement is adapted so that the ball emits only one note-beginning signal while traversing this guideway, its impact as it proceeds over the diversions and against the angles producing relatively subdued sounds which mark the beat of the measure, such sounds being clearly differentiated from the initial tone produced by the plate 19. The effect, therefore, may be perceived by the ear as a measured arrangement of regular counts of four, the first of which is accented and stressed and the succeeding three unaccented and unstressed.

Further examples of guideways are designated 20 and 21, each having four diverted areas similar to the diverted areas of guideway 12 and being distinguished as halfnote guideway 20 and quarternote guideway 21. The first and third enclosed angles of halfnote guideway 20 are provided with note plates 19 so that the first and third impacts of the ball traveling in the guideway produce distinctive sounds and the second and fourth impacts, being on unaccentuated angles, produce relatively subdued sounds. The effect is perceptible as a measured count for duration of two successive half notes in a measure containing four counts, the rhythmic factor in the notation being made perceptible by the impact of the ball on the second and fourth angles. Quarter note guideway 21 is provided with a note plate 19 on each of its four angles, each of the four counts of the measure, therefore, being distinguished by the sound that indicates the beginning of a note. Guideway 22 is provided with eight diversions, four thereof being intermediate of the diversion positions of guideway 21; and has a corresponding number of angles provided with note plates 19 for the striking of eight notes in a measure of the same total duration as the measure represented in the guideways previously described.

A further guideway 23 is provided with sixteen diversions and sixteen note plates for indicating sixteenth notes in a measure of four-four time in the structure shown.

A guideway 24 presents a different arrangement for a different effect, namely, an effect for eliciting apprehension of the relation of triplets to each other and to the action of a measure of common time. In this case four groups of two diversions each are provided, each group of diversions being associated with three enclosed angles and each angle being provided with a note plate 19. The impact of the ball, traveling gravitationally in the guideway, against successively the first angle of each group represents the beats or counts of the four units in a measure of common time, the additional two impacts in each group representing and signaling the additional two notes of each group of triplets.

A guideway 25 offers a further variance of rhythm representation in the series, namely, that of grace notes, these diversions and angles being so disposed in four groups that the first impact of a ball entering a groove indicates the beat or count and the second impact is produced relatively quickly after the first, the groups being so spaced that the interval between groups reflects nearly but not completely the duration of a quarter note.

In my structure as shown the upper ends of side walls of adjacent guideways are joined by transverse links 26 and the upper ends of sidewalls adjacent the side rails of the frame are attached to the frame as at 27 so that the only openings available to a ball are the entrances to the guideways.

A ball may be directed into a selected guideway or may be impelled to the plane field in a free area 28 produced by the spacing of the guideways from the front side of the field, to roll at random into one or another of the guideways for educational or amusement purposes as will be described. The side rails of the field are provided with apertures adjacent the front rail thereof. Mounted inwardly of the field on the rails or vertical enclosures of the field are semi-circular spring members 29 each having a reverse semi-circular seat 30 adapted to receive a ball and retain it, the seat having an orifice 31 through which a force may be applied to the ball by means of a finger of a hand 32 or by means of a wand 33, access to the spring member being available through the said apertures in the side rails.

I have described the manner in which a ball represents the time and rhythm of musical notations and will now call attention to further elements of my device. An indicia board is provided designated 34 and provided with orifices 35 adjusted to the guideways and through which the ball after traversing a guideway is permitted to pass. On this board is inscribed a staff 36 having eight divisions or bars such as 37 and 38, each bar associated with a guideway and representing a measure of music. Above such measure is inscribed a word descriptive of the characteristic note effect of the guideway with which the measure is associated, and on the staff in each measure is imprinted the musical notation which a particular guideway is adapted to represent.

Associated with each descriptive word are the digits 1, 2, 3 and 4 indicating the number of beats or counts in a measure of common time, the measure selected for illustration of the structure. Punctuation marks relate the digits of each group to the notes of the measure associated therewith, for example, the hyphens 39 joining pairs of digits to indicate that one note in one measure 37 has a duration of two beats, and braces 40 attaching three of the notes in measure 38 to a digit to indicate that three notes are sounded within the duration of one count.

Recesses such as 41 for the reception of a ball that has traversed a guideway are formed by the partitions 42.

While my device may be operated in a large variety of ways, I will describe operation in only a few. For example, a person may deposit a ball in the entrance of one of the guideways and listen to the audible effect of the distinctive impact of the ball against a plate 19 and the differentiated impact against unplated angles, thus receiving through the ear the associated representations of accent and rhythm. The player visually observes the guideway and the ball traversing it, so that while the impression of beat and rhythm are conveyed to the ear, the eye is also apprehending the effect. In the case of a child the impulse is to touch the object that is conveying an impression and the child will therefore follow with its fingers the outlines of the guideway, thereby perceiving the effect and apprehending the relations through the sense of touch as taught by sound. The operator is guided by the indicia in identifying the characteristics of a notation as represented by the ball and guideway. The operator may wish to discover the characteristics of a measure made up of eighth notes, for example, and so will deposit the ball in the guideway corresponding to the measure on the staff that discloses eighth notes.

An instructor using the device to assist a pupil will conduct demonstrations and tests in numerous ways that need not be detailed. It may be suggested, however, that the ability to present the qualities of time and rhythm to three faculties singly or collectively has important pedagogical advantages.

The device employed for amusement may be adapted to test the sense of rhythm of a group of persons either by designedly depositing the ball in selected guideways or by propelling the ball for random fall into a guideway. Identification of the characteristic effect of a guideway traversed by the ball is assured by the retention of the ball in the associated recess adjacent the measure inscribed on the staff that carries the description of said characteristic effect.

An instructor may also use the wand as a baton and beat time in consonance with the conduct and effect of the ball as it traverses a guideway. The instructor may also beat the time with the baton while indicating and explaining the position and structure of the guideway as representative of time and rhythm, adding the influence of the conventional method of visually disclosing the counts of a measure to the impression conveyed by the device and vice versa, and inculcating a knowledge of the significance of the conventional movements of a baton.

The use of the device as a game is primarily considered as a feature of its educational functions, and is particularly designed for the instruction of children in kindergarten and primary grades, as well as for individuals and groups who may have a taste for instructional qualities in competitive amusement. An example of a game that may be played with the device is one in which different values may be associated with the different measures of music, each contestant accumulating a score, the highest of which would entitle the maker to the victory.

Another example of a game played with this device is the construction of a musical score by each player or by an individual playing alone. The different measures successively represented by the ball in its successive passages through guideways constituting the time and rhythm elements of the score.

I am aware that many other adaptations of use exist for the device as described which will be obvious to a person skilled in music and which need not be detailed at this time. I wish, however, to refer to adaptations of structure which may be made by a person interested in representing harmony of sounds. One of these is the continuation of the guideways to provide for a plurality of measures to be represented by each guideway. Another is such adjustment of guideways in relation to each other that a plurality of guideways may be employed at one time for the representation, through the simultaneous traversal thereof by a similar plurality of balls, of a plurality of note values in a single measure, to represent, for example, a measure containing a whole note and notes of other values and rests. Still another adaptation of my disclosed structure consists in the provision of signal plates of different tonal values to represent different characteristics, an adaptation particularly useful in connection with the simultaneous actuation of two or more representing units.

I wish also to call attention to a further advantage of the association of the baton with the device wherein resides a further adaptation. The baton may be used as a pointer to outline the meandering course of a guideway, its movements in such process tending to suggest the conventional motions of a baton in the hands of a director, such use pointing to the provision of a devious course resembling one of my guideways to be displayed to a pupil or a class and for representation of time and rhythm in association with manipulations of the baton.

What I claim and desire to secure by Letters Patent is:

1. A device for representing rhythm comprising linearly distributed means of disclosing rhythmic intervals of a time series.

2. A device for representing rhythm comprising channel-like means for disclosing intervals of a rhythmic series and means for marking the intervals by sound.

3. A device for representing measure comprising parallel members forming a course, means on the course marking parts of a measure, and means for producing sounds synchronous with the parts of the measure.

4. A device for representing measure comprising a course, means on the course marking parts of a measure and tone-emitting elements associated with said means for producing sounds synchronous with the parts of the measure.

5. A device for representing rhythm comprising a box-like board, channels on the board in parallel areas and having diverted sections, tone-emitting elements positioned within the channels at related extremities of diversion, and a ball adapted to travel in a channel and actuate the tone-emitting elements.

6. A device for representing elements of music comprising a box-like board, a channel on the board having diverted sections, tone-emitting elements positioned within the channel at related extremities of diversion, means for actuating the tone-emitting elements to produce a musical effect, and an indicia member associated with the channel having a staff provided with notations corresponding to the musical effect produced by the tone-emitting elements.

7. A device for representing rhythm comprising a surface provided with a delineation of a continuous path having diverted sections representing parts of a measure, and indicators positioned at points of divergence of said sections.

8. A device for representing rhythm comprising a surface provided with a delineation of a continuous path having diverted sections representing parts of a measure, and a staff member positioned in identifying relation with the path provided with musical notations representating said parts of said measure.

In testimony whereof I affix my signature.

ETHEL LEE BUXTON.